March 23, 1954  G. R. TREMOLADA  2,673,103
RECIPROCATING ROD PACKING
Filed Feb. 3, 1951
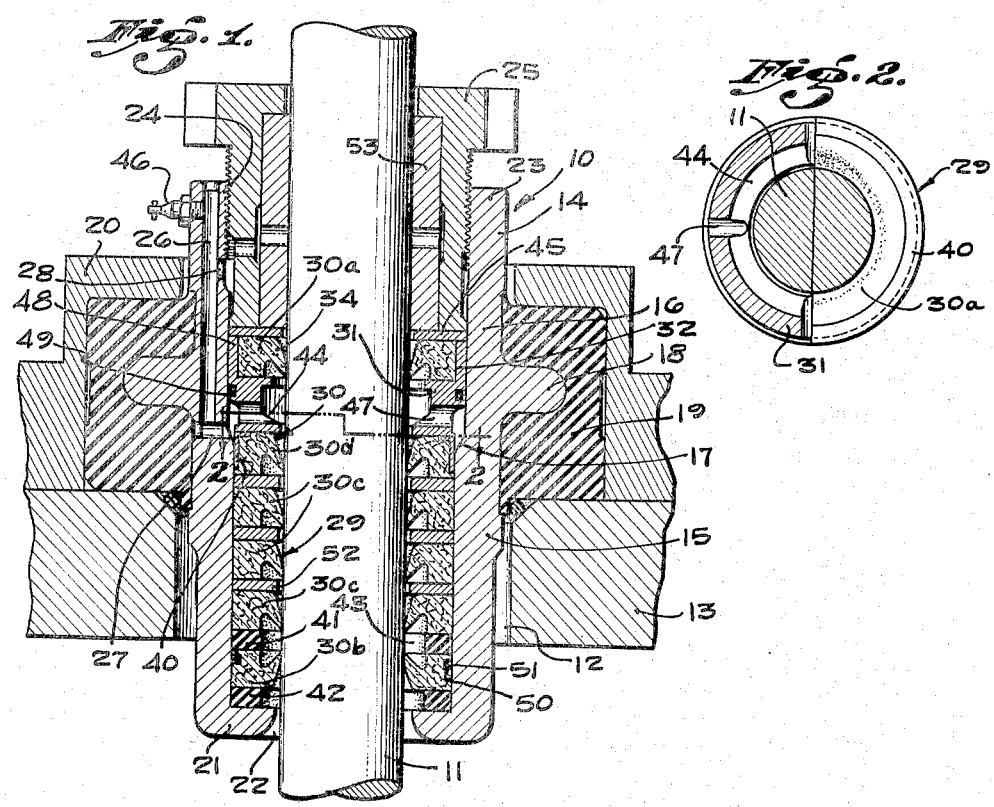
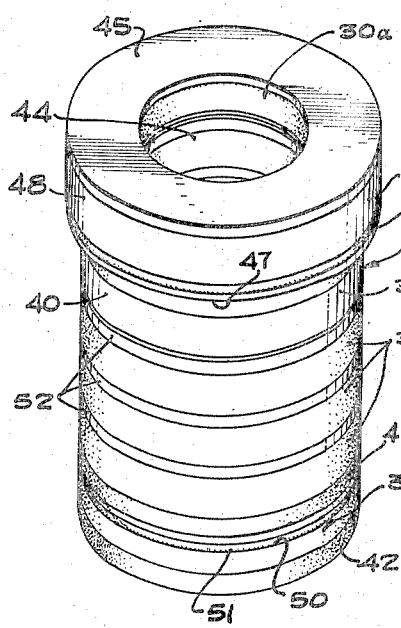
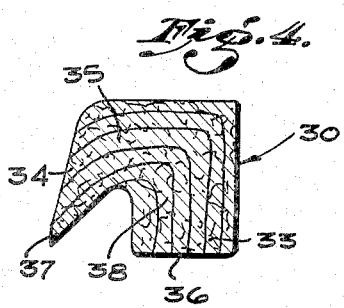
INVENTOR.
GUGLIELMO R. TREMOLADA,
BY
ATTORNEY Patented Mar. 23, 1954

2,673,103

UNITED STATES PATENT OFFICE 2,673,103

RECIPROCATING ROD PACKING

Guglielmo R. Tremolada, Los Angeles, Calif., assignor to Emsco Manufacturing Company, a corporation of California Application February 3, 1951, Serial No. 209,305

5 Claims. (Cl. 286—27)

My invention relates to packing devices and relates in particular to a packing device which will make an effective seal around a rod without excessive frictional restraint to movement of the rod.

It is an object of the invention to provide a packing unit consisting of a number of rings secured together so that the assembly of rings may be moved bodily into a packing chamber. In this packing unit I provide means for lubrication and provide an arrangement whereby an improved type of packing ring may be used throughout the assembly.

A further object of the invention is to provide a packing unit or cartridge having at the rear end thereof a lubricator ring through which lubricant is introduced into an annular space within the packing unit adjacent a portion of the shaft surface, the lubricator ring having means for supporting a packing ring of the same type as that employed for packing off around the surface of the shaft or rod against relatively high pressure.

The present object of the invention is to provide a packing device having rings arranged so as to trap lubricant in an annular space near the front end of the packing.

It is a further object of the invention to provide a packing device having a shell of generally cylindrical form, this shell having a first cylindrical section and a second cylindrical section of slightly larger diameter than the first cylindrical section, thereby providing in the shell a stepped cavity arranged to receive a packing unit having an enlargement at its rear end, this enlargement comprising a lubricator ring which supports a packing ring so as to define an annular space around the surface of the rod or shaft being packed off, which space is arranged to receive lubricant.

A further object of the invention is to provide a packing unit formed of packing rings each of which has an annular body with a conically projecting sealing lip, the packing ring at the front end of the packing unit being reversed so as to define adjacent the next packing ring of the unit a chamber in which lubricant will be trapped. In this arrangement a better lubrication of the packing is obtained and excessive wear of the packing and of the shaft as a result of poor lubrication is avoided.

Further objects and advantages of the invention may be brought out in the following part of the specification wherein the detailed description of a preferred embodiment of the invention is for the purpose of disclosure and is not intended to limit the scope of the invention set forth in the appended claims or limit the range of equivalents to which the claims are entitled.

Referring to the drawings which are for illustrative purposes only:

Fig. 1 is a fragmentary sectional view showing a packing device according to my invention;

Fig. 2 is a sectional view taken as indicated by line 2—2 of Fig. 1;

Fig. 3 is a perspective view of the packing unit or cartridge forming a part of the invention;

Fig. 4 is an enlarged view of the cross-section of a packing ring used in the invention.

The packing device 10 shown in Fig. 1 is for the purpose of preventing leakage of fluid along the surface of a rod 11 which projects through an opening 12 in a wall 13. Herein the term "rod" is intended to include any rod or shaft which extends from a zone of lower pressure to a zone of higher pressure and has rotary and/or axial movement.

The packing device 10 includes a shell 14 having a first cylindrical section 15 and a second cylindrical section 16, the internal diameter of the second section 16 being greater than the internal diameter of the first section 15 with the result that there is an internal shoulder 17. The second cylindrical section 16 has thereon a radial rib 18 around which a rubber ring 19 is molded. The packing device is held in place on the wall 13 by a fitting 20 which is secured to the wall 13 and clamps the rubber ring 19, which rubber ring 19 then yieldably supports the shell 14 of the packing device 10.

The shell 14 has at its front end an inwardly turned flange or shoulder 21 defining an opening 22 through which the rod 11 extends. At the rear end of the shell 14, the second section 16 has internal threads 23 to receive the external threads 24 of a packing nut 25 which projects into the rear end of the packing cavity defined by the shell 14. In the wall of the second section 16 there is a lubricant passage 26 which communicates through a port 27 with the interior of the second section adjacent the shoulder 17 and through a port 28 with an intermediate point in the interior of the second section 16.

The shell 14 contains therein packing means 29 including a plurality of packing rings 30 which occupy the first section 15, a lubricator ring 31 disposed within the second section 16 adjacent the shoulder 17 and a packing ring 30 designated specifically as packing ring 30a which is secured in an annular cavity 32 in the lubricator ring 31.

As shown in Fig. 4 each of the packing rings 30 comprises an annular body 33 of relatively hard consistency and a lip 34 which extends conically from the rear portion 35 of the annular body toward the front end 36 thereof. The lip 34 is large at its base and tapers off to a knife edge 37 at the point of engagement of the lip 34 with the surface of the rod 11. The packing ring 30 is molded from impregnated fabric, and as indicated by dotted lines 38 in Fig. 4 the fabric layers extend from the annular body 33 into the lip 34. Pressure of fluid against the face 39 of the lip 34 causes the lip to engage the surface of the rod 11 so as to seal against a passage of fluid along the surface of the rod 11.

The plurality of packing rings 30 within the section 15 are, with the exception of the ring indicated at 30b, faced forwardly or against the pressure of fluid which is to be packed off. That is to say the lips 34 of the packing rings indicated by the numerals 30c and 30d are faced toward the front end of the packing device. The packing ring 30 indicated by the numeral 30d projects slightly beyond the shoulder 17 and to prevent radial expansion of the outer portion of the packing ring 30d a cylindrical shield 40 is applied to a portion of the circumference of the packing ring.

The reversed ring 30b is spaced from the adjacent ring 30c by a rubber spacing ring 41 and a similar rubber ring 42 is disposed between the ring 30b at the shoulder 21. Between the lips of the ring 30b and the adjacent ring 30c an annular cavity 43 is formed around the adjacent portion of the rod 11, in which cavity 43 grease or oil is trapped, thereby maintaining a supply of lubricant at the front end of the packing.

The packing ring 30a is the same as the packing ring 30 described in detail in Fig. 4, and its lip 34 is faced forwardly so as to prevent escape rearwardly of lubricant which has been forced into the annular space 44 formed by the lubricator ring 31 around a portion of the rod 11. An annular wall or washer 45 substantially closes the rear end of the cavity 32 which contains the packing ring 30a. When lubricant is forced through a grease fitting 46 into the grease passage 26, a portion of the grease will flow through the port 27 and then through radial openings 47 in the lubricator ring into the annular space 44. Since the packing ring 30a prevents escape of grease rearwardly from the chamber 44, the grease will flow down the surface of the rod 11 through the assembly of packing rings into the grease trapping space 43. To prevent escape of grease along the exterior face of the enlargement 48 of the lubricator, a sealing ring 49 is seated in a groove in the external face of the enlargement 48. As shown in Fig. 1 the annular body of the packing ring 30b has an external groove 50 with a sealing ring 51 therein. The rear face of each packing ring 30c is supported by a metal supporting ring 52.

All of the packing rings 30, the lubricator ring 31 and the rings 41, 42 and 52 are connected together so as to form the assembly of rings into a unit which may be handled as such, thereby preventing the necessity of separately placing the various rings in the packing chamber of the shell 14. The enlargement 48 of the lubricator ring 31 prevents the packing unit from being placed in the shell 14 in reversed position. If an attempt were made to place the packing unit in the shell 14 in reversed position, the lubricator ring would go into the section 16 only as far as the shoulder 17, leaving a portion of the front end of the packing unit projecting from the shell 14 so that the nut 25 could not be installed. This nut 25 is equipped with a bearing 53 which is a relatively close fit around the rod 11 and is lubricated by grease from the port 28. The bearing 53 tends to hold the packing device 10 in axial alignment with the rod 11 and such small movement as may be required to accomplish this alignment is permitted by the yielding of the resilient supporting means consisting of the rubber ring 19. These rings are secured together, in the mebodiment of the invention disclosed, by layers of cement disposed between the rings.

I claim:

1. In a packing device of the character described for packing around a rod: a shell comprising a first cylindric wall section and a second cylindric wall section of larger internal diameter than said first cylindric wall section, there being a lubricant duct communicating with the interior of said second section adjacent said first section; a plurality of packing rings in said first section arranged for sealing engagement with said rod; a lubricator ring engaging the rearward ring of said plurality of packing rings in said first section, said lubricator ring having an enlargement in said second section, said enlargement having an annular cavity and a duct connecting said lubricant duct with the interior of said lubricator ring adjacent said cavity; a sealing ring in said annular cavity arranged to make sealing engagement with the surface of said rod and retain lubricant within said lubricator ring; and means for holding said rings in said shell.

2. In a packing device of the character described for packing around a rod: a shell comprising a first cylindric wall section and a second cylindric wall section of larger internal diameter than said first cylindric wall section, there being a lubricant duct communicating with the interior of said second section adjacent said first section; a plurality of packing rings in said first section arranged for sealing engagement with said rod, the packing ring at the front end of said plurality of packing rings having a sealing lip faced rearwardly so as to form a lubricant trap between itself and the adjacent packing ring; a lubricator ring engaging the rearward ring of said plurality of packing rings in said first section, said lubricator ring having an enlargement in said second section, said enlargement having an annular cavity and a duct connecting said lubricant duct with the interior of said lubricator ring adjacent said cavity; a sealing ring in said annular cavity arranged to make sealing engagement with the surface of said rod, said sealing ring comprising an annular body with a sealing lip extending conically from the rear portion thereof so as to hold lubricant within said lubricator ring; and means for holding said rings in said shell.

3. In a packing unit for packing around a rod which extends through a packing chamber having an enlarged portion at one end thereof: a plurality of packing rings arranged coaxially and consecutively; a lubricator ring at the rear end of said plurality of packing rings, said lubricator ring having a cylindrical enlargement, said enlargement having an annular cavity to receive a packing ring of the same diameter as said packing rings and having between said cavity and the opposite end thereof a lubricant passage; a packing ring in said annular cavity arranged to engage said rod; and means connecting said rings together so that they will then form the packing unit.

4. In a packing unit for packing around a rod which extends through a packing chamber having an enlarged portion at one end thereof: a plurality of packing rings arranged coaxially and consecutively, each of said packing rings comprising an annular body with a sealing lip extending conically from the rear portion of said annular body, the packing ring at the front end of said plurality of packing rings being placed with its lip faced rearwardly so as to form a lubricant trap and the remaining rings of said plurality of packing rings being placed with the lips thereof faced forwardly; a lubricator ring at the rear end of said plurality of packing rings, said lubricator ring having a cylindrical enlargement, said enlargement having an annular cavity to receive a packing ring of the same diameter as said packing rings and having between said cavity and the opposite end thereof a lubricant passage; a packing ring in said annular cavity arranged to engage said rod, said packing ring comprising an annular body with a sealing lip extending conically from the rear portion thereof; and means connecting said rings together so that they will then form the packing unit.

5. In a packing unit for packing around a rod which extends through a packing chamber having an enlarged portion at one end thereof: a plurality of packing rings arranged coaxially and consecutively; a lubricator ring at the rear end of said plurality of packing rings, said lubricator ring having a cylindrical enlargement, said enlargement having an annular cavity to receive a packing ring of the same diameter as said packing rings and having between said cavity and the opposite end thereof a lubricant passage; a cylindric shell on the circumferential portion of the packing ring which is disposed adjacent said lubricator ring; a packing ring in said annular cavity arranged to engage said rod; and means connecting said rings together so that they will then form the packing unit.

GUGLIELMO R. TREMOLADA.

References Cited in the file of this patent

UNITED STATES PATENTS

| Number | Name | Date |
|---|---|---|
| 1,342,734 | Barthez | June 8, 1920 |
| 1,425,268 | Massa | Aug. 8, 1922 |
| 1,712,003 | Hubbard | May 7, 1929 |
| 1,787,317 | Labus | Dec. 30, 1930 |
| 2,033,796 | Weinschenker | Mar. 10, 1936 |
| 2,037,046 | Robertson | Apr. 14, 1936 |
| 2,052,603 | Christensen | Sept. 1, 1936 |
| 2,256,343 | Hubbard | Sept. 16, 1941 |
| 2,451,269 | Allen | Oct. 12, 1948 |
| 2,470,960 | Tremolada | May 24, 1949 |

FOREIGN PATENTS

| Number | Country | Date |
|---|---|---|
| 265,613 | Switzerland | Mar. 1, 1950 |